Nov. 14, 1967     J. G. CUMMINGS ET AL     3,352,472
CONTAINER FOR FROZEN PRODUCT
Filed Aug. 31, 1966     2 Sheets-Sheet 1
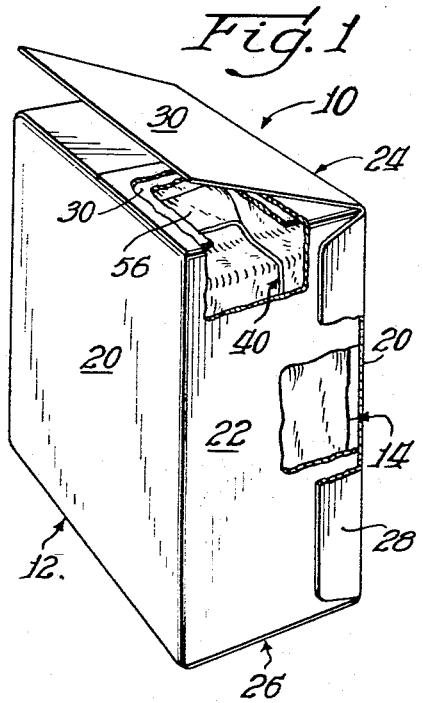
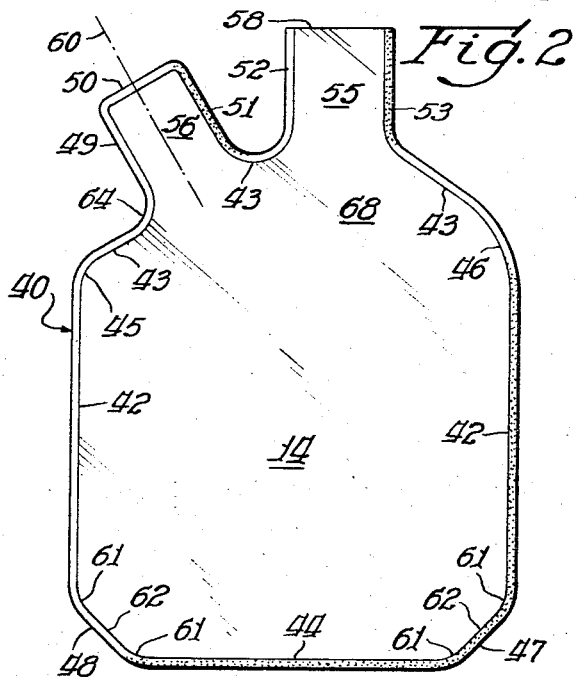
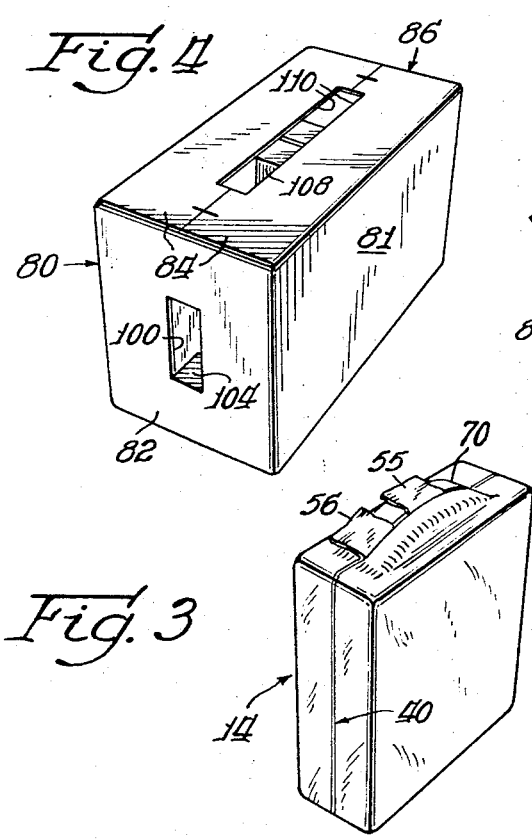
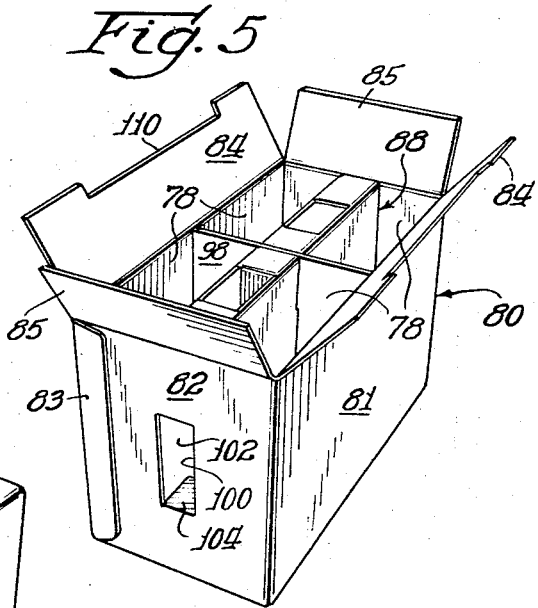
Inventors:
Jan G. Cummings
and Richard N. Maskell
By: Higge, Carpenter + Lind Attys.

Nov. 14, 1967  J. G. CUMMINGS ET AL  3,352,472
CONTAINER FOR FROZEN PRODUCT
Filed Aug. 31, 1966  2 Sheets-Sheet 2
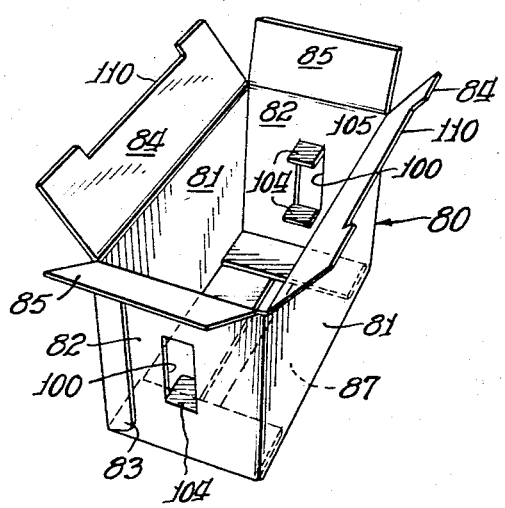
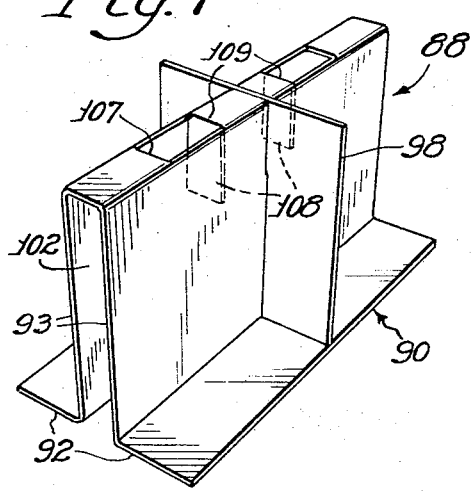
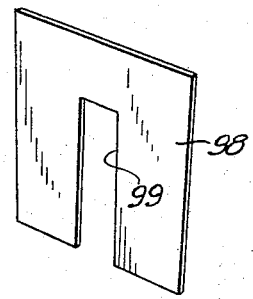
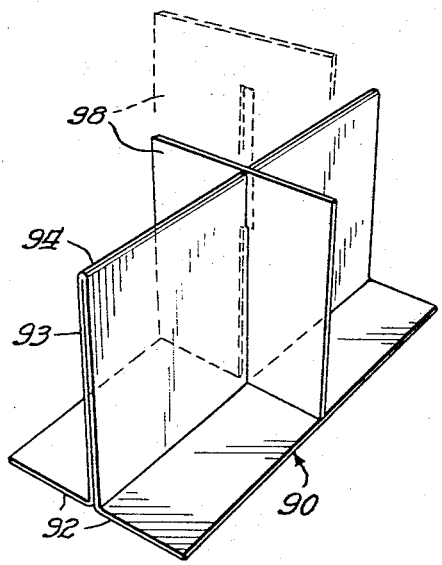
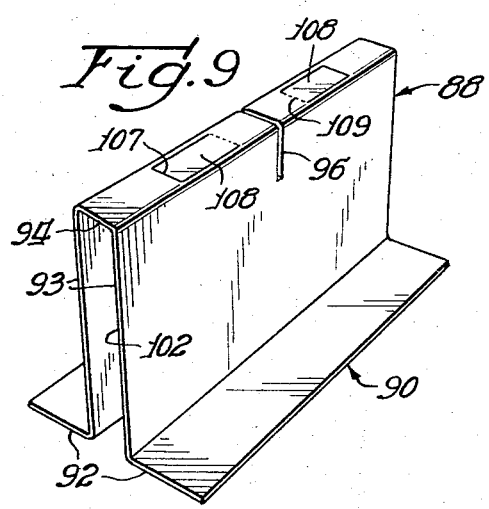

3,352,472
CONTAINER FOR FROZEN PRODUCT

Jan G. Cummings, Altona, and Richard N. Maskell, Chicago, Ill., assignors to Container Corporation of America, Chicago, Ill., a corporation of Delaware
Filed Aug. 31, 1966, Ser. No. 576,287
11 Claims. (Cl. 229—14)

This invention relates to a container for holding a normally liquid product in a frozen state, and more particularly, to an improved container that provides for quick-freezing of the product, and further that permits sampling of the product even while in the frozen condition.

Presently, liquid food products such as eggs, juice concentrates or the like are being packaged in 5 gallon or 30 pound bulk containers as liquids and are then frozen and maintained frozen until ultimate use by the consumer. Containers for this type packaging include metal cans, barrels, and bag-in-box combinations. One basic requirement for all egg packages, regardless of the style, is that standard set by the United States Department of Agriculture (USDA) which states that the product must be completely frozen from its initial liquid condition within a 60 hour period. This "quick freezing" minimizes bacteria growth within the product. To test whether the product is actually frozen solid within this period, as well as to test the chemical content of the product for grading purposes, a sample of frozen product is removed from the container. If the sample is found to contain product in liquid form, the container is rejected under the USDA standard.

Since both the size of package and the physical layout and capacity of the freezing house in which the packages are frozen are fixed, the packer is quite justified in his complaint when the USDA standard cannot be made.

This invention improves the freezing characteristics of a container adapted for this purpose by providing a particular ratio of box length to box thickness to box height of two to one to two.

This ratio gives a practical box that is thin enough to provide for quick freezing of the product and yet wide enough to provide for stable stacking of the containers and further offers an economical blank design. The two to one length to thickness ratio further permits stacking of like containers on one another in an interlaced manner to insure stability of the stack. Also, the relatively thin box provides for less bag wrinkling at the corners since the wrinkling characteristics of a bag increases in proportion to the square of the thickness of the box. The fewer wrinkles in the bag improves the stripping characteristics of the frozen product from the bag and greatly increases the reliability of the bag against product leakage. The two to one ratio also provides for easy handling of the container, since the ends are spaced apart approximately shoulder width and since the reduced thickness brings the center of the load closer to the person carrying the container. In the vented container disclosed herein, the end wall vent openings act as handholes for lifting the container.

This two to one ratio container has been found in still air tests to provide product freezing 10 percent quicker than a similar volume cubical container. The percentage difference increases as air circulation increases since the subject proportioned box provides greater surface area for the product with a lesser core distance while it also improves the aerodynamic characteristics of air flow over the box to maintain high velocity air circulation. In this regard, it is desirable to drive the cooling air along the long dimension of the box and to stack like boxes in rows behind one another. It is possible by venting the container to increase the cooling capacity by as much as fifty percent. When venting containers, it is again desirable to provide that the venting channel or cavity in the box extend longitudinally of the box so that the air is exposed to a greater area of product.

Another basic improvement of this invention is the provision of a flexible bag which is contoured at the corners in a specific manner to minimize bag wrinkling. Bag wrinkling is undesirable since there is a greater tendency for the frozen product to pinch the bag and cause leakage at the wrinkles, and the product cannot be removed as easily while in the frozen state where the bag is trapped within the frozen product.

An additional improvement in the subject package is the provision therein of an inspection nipple or spout formed in the bag liner which permits the USDA inspector to obtain a sample of the frozen product. The inspection nipple or spout is located at the top of the bag in an area where its juncture with the bag proper will always be void of frozen product and void of wrinkling. This means that, the inspector can snip the end of the inspection nipple, obtain a sample of product while it is still frozen, and thereafter clamp the nipple close. The lack of wrinkles in the area of juncture of the spout and bag permits the insertion of a drill for core sampling of the frozen product. Also, by sloping the spout on an angle relative to the mass of product, the product can be tested at various locations relative to the depth and transverse location of the bag.

In the subject container, the bag is filled with liquid product to a level below the top wall of the outer box. The top of the bag is concave toward the product and loose at the center of the box. Upon freezing, the liquid product is initially frozen solid at the perimeter of the container and fixes the adjacent portions of the bag against or relative to the box walls. Depending upon the liquid content of the product and the rate of freezing, the center core of the product expands upon freezing to rise in the contoured center of the bag above the normal liquid level of the product and form a central hump of product. In this regard, the faster the freezing time, the more violent the eruption and the higher the dome; and similarly, the more the water content, the higher the dome. Because the perimeter of the bag is fixed by the initial product freezing adjacent the side walls, the expanding central hump draws against the top of the bag to remove all product from the nipple juncture with the bag and thus provide for a wrinkle free nipple when the product is frozen. Since all of the liquid is drained from the nipple at its juncture with the bag, the inspector can snip the top of the nipple to collect the required sample. Thus, a drilling tool can be inserted past the junction of the nipple with the bag to core drill the product. After the top is snipped off, the spout is closed or sealed again by means of a mechanical sealing ring or clamp.

Another improvement of this invention is a partitioned container wherein a plurality of cells are defined to hold separate bags of product. The partition includes crossed longitudinal and transverse elements and the transverse element is dimensioned to extend above the longitudinal element to prevent the bag from creeping beneath the partition and avoid bag pinching. The longitudinal partition element includes opposing feet which overlap the bottom wall of the container which being integral with the vertical elements prevent bag pinching. The feet also reinforce the bottom structure and by proper dimensioning, locate the partition in a fixed position relative to the opposing sidewalls of the box. The partition structure can provide either a vented or a non-vented container. In the vented container, the longitudinal partition is further located relative to the box by means of tabs die cut in the end walls of the box, which form thereby the venting openings for the container and also reinforced hand holes for lifting the container. By these means a longitudinal vent cavity is defined down the center of the box and permits rapid movement of air in one area where the panels are of the greatest dimension. In actual experiments, it has been found that the vented container has a cooling rate of about 40 to 50% greater than that of a non-vented container having equal volume. Top and bottom vents can be made in the container which give a chimney effect of the air warmed by the product to increase the freezing rate in low velocity freezers.

Accordingly, a primary object of this invention is to provide a container suitable for holding a normally liquid product which is adapted to be frozen and maintained in the frozen state.

Another object of this invention is to provide a container having an outer box and an inner bag for confining therein a liquid product, and shaping the bag in a particular manner to minimize bag wrinkling at the corners of the box to improve the durability of the bag and eliminate bag pinching during product freezing.

Another object of this invention is to provide means in the inner bag to permit sampling of the product therein while the product is still frozen.

Another object of this invention is to provide a container for confining a plurality of bags for holding a liquid product adapted to be frozen, and in particular, to provide suitable partition means for adequately separating the bags.

Another object of this invention is to provide a partitioned container having improved venting means to increase the cooling capacity of the container.

Another object of this invention is to provide a venting partition construction which in combination with particular tabs located on outer box is securely held in place within the box.

These and other objects will be more fully understood and appreciated after reviewing the following specification which includes as a part thereof the accompanying drawings where:

FIG. 1 is a perspective view, partly broken away to show the interior construction, of a primary embodiment of the subject container;

FIG. 2 is a top plan view of a bag suitably formed for use within the container disclosed in FIG. 1 as a product confining liner, the bag being shown in the flat collapsible condition;

FIG. 3 is a perspective view of the bag shown as it appears when the product confined therein is frozen;

FIG. 4 is a perspective view of a second embodiment of the subject invention including specifically a partitioned container providing therein a plurality of individual cells for holding a plurality of bags;

FIG. 5 is a perspective view of the container shown in FIG. 4, except with the top closure flaps being in the opened position;

FIG. 6 is a perspective view of the outer box shown in FIGS. 4 and 5, with the internal partition structure being removed therefrom;

FIG. 7 is a perspective view of the internal partition structure used in the container shown in FIGS. 4 and 5;

FIGS. 8 and 9 are perspective views of the individual components used to form the partition structure shown in FIG. 7;

FIG. 10 is a perspective view, similar to FIG. 7, of a modified partition structure.

The subject invention includes an improved form of container suitable for holding a normally liquid product which is adapted to be frozen while within the container and maintained therein in the frozen state. The container 10 includes basically an exterior box 12 formed of relatively stiff shape-retaining paperboard and an interior bag 14 of a plastic film.

The plastic film used for the bag is such that it can hold in a liquid state the product confined therein, and the box is designed to confine and support the bag 14 including the liquid product. The box 12 has an opposed pair of major side walls 20 and an opposed pair of minor side walls 22, and opposed top and bottom walls 24 and 26, respectively. The opposed pairs of major and minor side walls are formed to a tubular structure in a typical manner as single-ply panels from an elongated blank wherein a manufacturer's flap 28, hinged to one side wall at one end of the blank is overlapped and secured to the side wall at the opposite end of the blank. The top and bottom walls are formed by overlapping flaps hinged to the respective major and minor side walls, the preferred flap arrangement including inner and outer major flaps 30 hinged to the major side walls and extending completely across the defined tubular structure, and intermediate minor flaps hinged to the minor side walls and each extending approximately halfway across the defined tubular structure.

The box 12 is dimensioned so that each major side wall 20 is approximately square having approximately equal horizontal and vertical dimensions, and so that each minor side wall 22 has a horizontal dimension that is approximately one-half that of the major side wall 20. This defines a box having the approximate ratio of two to one to two for the length to thickness to height dimensions. As was mentioned previously, this particular proportion of box side walls is preferable to all others, since it affords an economical blank construction while further providing an interior confinement that is particularly suitable for freezing a liquid confined therein.

It should be noted that in practice, length of the box should be slightly more than twice the thickness of the box to permit interlacing of like boxes even with the slight bowing of the side walls when confining the product.

The bag 14 suitable for use in the subject invention is shown in collapsed flat condition in FIG. 2. The bag is formed from two flat sheets of the plastic film disposed in face to face relationship which are joined together by a peripheral seam 40. The seam 40 includes side segments 42, top segment 43, bottom segment 44, interconnecting corner segments 45, 46, 47, 48, and spout or nipple defining segments 49, 50, 51, 52 and 53. Preferable, the side segments 42 are parallel to one another and are spaced apart a distance equal to the combined horizontal dimensions of one major and one minor side wall. This is one-half of the horizontal perimeter of the box. The bottom segment 44 extends at right angles to and approximately between the side segments 42, and the bottom corner segments 47 and 48 interconnect the opposite ends thereof to the lower ends of the side segments. The top segment 43 of the bag seam lies generally along a line disposed convex in a direction away from the bottom segment 44 and across the bag between the top corner sections 45 and 46. The distance between the top and bottom sections 43 and 44, respectively, at the approximate center of the bag is equal approximately to the combined horizontal and vertical dimensions of one minor side wall. The two spout or nipple connections 55 and 56 to the interior of bag are located along the top segment of the bag.

Spout 55 extends generally vertically from the bag, approximately at the center thereof, and is open at its top edge 58 to provide for the initial filling of the bag. After the bag is filled with product, it can be pinched or clamped closed by conventional mechanical means or it can be heat-sealed closed if desired. The spout 56 is shown at an angle along line 60 which extends approximately through the geometric center of the bag. The purpose of spout 56 is to permit inspection for sampling of the product when it is in the frozen condition by means of a core drill. This permits sampling of the product from the center of the frozen block confined within the bag. The spout 56 is closed typically by the peripheral seam section 50.

One important consideration in the design of the subject bag is the minimizing of bag wrinkles at the corners of the box, which are somewhat inherent in the formation of a three-dimensional bag from flat sheets. To accomplish this, the spouts 55 and 56 have their connections to the bag proper generally along the convex top segment 43, and the top segment 43 blends in smoothly with the corner segments 45 and 46 of the bag, and through rounded corner segments with the spout defining sections 49, 51, 52 and 53. Similarly, the corner segments 45, 46, 47 and 48 are cut away and generally include circular sections each of a radius of curvature less than one-half the horizontal dimension of one minor side wall. In this regard, each bottom corner segment 47 and 48 includes a circular section 61 having a radius of curvature that is less than one-half the horizontal dimension of one minor side wall, and a straight section 62 disposed at approximately a 45° angle between the circular sections 61. The location of the circular section 64 for the inspection nipple 56 is spaced from the adjacent side section 42 a distance greater than one-half the horizontal dimension of the minor side wall. This spaces the inspection spout from the adjacent minor side wall of the box when the bag is filled to permit the opening thereof for providing access to the frozen product.

The bag is adapted to be filled with liquid product to a height relative to the box below the top wall thereof. This means that in the flat condition of the bag, the fill line is approximately in line with or slightly below the centers of curvature of the top corner segments 45 and 46. When the bag is filled to this height, the liquid product, when subjected to freezing condition, freezes initially above the horizontal perimeter of the container and thereafter freezes along a generally vertical central core. Since most liquids expand during freezing, the top surface of the liquid product expands as a hump 70 adapted to fit within the bag dome 68. The fill level of liquid is such that the hump expands approximately to a height against the top wall 24 of the container. This adds strength to the container since the solid core of frozen product greatly increases the stacking ability of like containers on one another.

Initially, the liquid product bows the box side walls out slightly, although hardly noticeable, and the bag is in substantially snug engagement with the side walls. The contoured bottom corners of the bag provide for a minimum of bag wrinkling at these locations when the two-dimensional bag is expanded by the liquid product into the three-dimensional box. Since the liquid product freezes initially about the horizontal perimeter of the box or container, the top horizontal perimeter of the bag is held firmly relative to the box side walls. The expanding hump of product moves against the top portion of the bag and thereby draws the bag taut in the area of juncture between the spouts and interior of the bag. This provides that all liquid product is removed in the area of juncture between the inspection spout 56 and the bag proper and thereby permits the spout to be snipped open at its end 50 to sample the product in the bag. In this regard, the spout frequently fills with liquid which freezes as a pillow-shaped mass, which is removed from the spout during the sampling.

FIGS. 4–10 show alternate embodiments of a container suitable for holding a frozen product. Each container is partitioned to define within the outer box a plurality of open top cells 78 each of which is adapted to confine a separate bag of product. Two such partitioned containers are disclosed and include a vented partitioned container in FIGS. 4–9 and a non-vented partitioned container in FIG. 10.

FIG. 6 shows a typical outer box 80 which is suitable for use with both the vented and non-vented partitioned containers. The box includes an opposed pair of major side walls 81 and an opposed pair of minor side walls 82 each hinged to one another at the adjacent end edges to form by means of the lapped and secured manufacturer's flap 83 a tubular structure. End closure flaps form the top and bottom walls 86 and 87, respectively, and include major side wall flaps 84 hinged to the major side walls 81 and minor side wall flaps 85 hinged to the minor side walls 82. In the preferred embodiment, the flaps are of nearly equal heights, and the major side wall flaps 84 each extend one half way across the tubular structure.

The partition structure 88 for dividing the interior of the box 80 into four separate cells is disclosed in FIGS. 7, 8, and 9 and is formed from two separate blanks of paperboard. The major blank 90 includes a pair of foot elements 92 which are adapted to rest on the bottom wall 87 of the box 80, opposed vertical elements 93 upstanding from the foot elements, and an interconnecting web 94. The vertical elements 93 and web 94 are provided with a top opening slot 96, and the second partition blank 98 has a bottom opening slot 99 therein, that is adapted to be fitted over the vertical partition elements 93 within the slot 96. The secondary partition member 98 is slightly higher in dimension than the vertical partition members 93 relative to the foot elements 92, to provide that when the top closure flaps of the top wall are closed, the secondary partition member offers support to the closure wall and prevents the bag from creeping beneath the partition.

The embodiment of the partition member disclosed in FIGS. 7–9 is of the vented type, and provides that the web element 94 has a finite width to separate the adjacent vertical elements 93 from one another. This defines between the vertical elements, when the partition structure 88 is positioned in the box 80, an elongated channel or cavity 102 within the box. Openings 100 are provided in the minor side walls 82 of the box in registry with the cavity 102 to permit circulation of air from the exterior of the box to and through the vertically defined cavity. Preferably, each opening 100 is defined by means of a tab 104 cut on three edges and hinged on the remaining fourth edge along hinge line 105 to the side wall to permit the tab to be folded between the vertical elements 93 of the partition and thereby support the vertical element relative to the box. A top opening 107 can be provided in the web element 94 itself, the opening 107 similarly being defined by means of tabs 108 hinged along line 109 to the web. This strengthens the partition structure within the box 80. The major side wall flaps 84 have their free edges trimmed back at slots 110 that define an opening in registry with the top openings 107 in the partition element. This thereby provides for complete ventilation of the cavity 102.

As was mentioned above regarding the primary embodiment, each of the subject cells defined in the partitioned container preferably are proportioned to give a length to thickness to height ratio of two to one to two. Because of the longitudinal venting cavity 102, the outer vented container is not proportioned precisely according to this ratio, but is kept quite close to the ratio.

Regarding also the use of the elongated cartons, it has been found desirable in a freezer to orient the containers with their elongated dimensions extended in line with the direction of flow of the cooling air. Similarly, when a plurality of like containers are stored in the freezer house, it is desirable to align the containers end to end so that single channels are defined between adjacent rows of containers. As was mentioned above, it has been found that the vented container disclosed in the FIGS. 4–9 provide an approximate fifty percent improvement in the freezing time as compared to a similar non-vented container of similar capacity.

What is claimed is:

1. A container for confining a normally liquid product in a frozen state, the combination comprising:
   (a) an exterior box of paperboard having opposed interconnected pairs of parallel major and minor side walls, and opposed parallel top and bottom walls;
   (b) each major side wall of the box having approximately equal horizontal and vertical dimensions, and each minor side wall of the box having a horizontal dimension that is approximately one-half that of the major side wall;

(c) an interior bag of a plastic film material disposed within the paperboard box and supported by the side walls thereof, and confining said product;

(d) said bag being filled with liquid product to a height relative to the box to below the top wall thereof, so that the liquid product, when subjected to freezing conditions, can freeze initially about the horizontal perimeter and thereafter freeze along a vertically located central core which expands as a hump against the top wall of the box.

2. A container for confining a normally liquid product in a frozen state, the combination comprising:

(a) an exterior box of paperboard having opposed inter-connected pairs of parallel major and minor side walls, and opposed parallel top and bottom walls;

(b) each major side wall having a horizontal dimension that is approximately twice that of the minor side wall, and having a vertical dimension at least twice the minor side wall horizontal dimension;

(c) an interior bag of a plastic film material disposed within the paperboard box and supported by the side walls thereof, and confining said product;

(d) said bag being formed from two flat sheets disposed in face to face relationship joined together by a peripheral seam including, when the bag is in the collapsed condition, side segments, top and bottom segments, and inter-connecting top and bottom corner segments, (i) said side segments being spaced apart a distance equal to the combined horizontal dimensions of one major and one minor side wall;

(ii) said top segments generally lying along a line disposed convex outwardly away from the bottom segment across the bag between the top corner segments and spaced from the bottom segment at its center a distance approximately equal to the combined horizontal and vertical dimensions of one minor side wall to define a central dome;

(e) a spout communicating with the interior of the bag at a location along the convex top segment line spaced from the adjacent side segment a distance greater than one-half the width of the minor side wall;

(f) said bag being adapted to be filled with liquid product to a height relative to the box to below the top wall thereof, so that the liquid product, when subjected to freezing conditions can freeze initially about the horizontal perimeter and thereafter freeze along a vertically located central core as a hump expanding into the bag dome and against the top wall of the box.

3. A container for confining a normally liquid product in a frozen state, the combination comprising:

(a) an exterior box of paperboard having opposed interconnected pairs of parallel major and minor side walls, and opposed parallel top and bottom walls;

(b) each major side wall having approximately equal horizontal and vertical dimensions, and each minor side wall having a horizontal dimension that is approximately one-half that of the major side wall;

(c) an interior bag of a plastic film material disposed within the paperboard box and supported by the side walls thereof, and confining said product;

(d) said bag being formed from two flat sheets disposed in face-to-face relationship joined together by a peripheral seam including, when the bag is in the collapsed condition, side segments, top and bottom segments, and interconnecting top and bottom corner segments, (i) said side segments being spaced apart a distance equal to the combined horizontal dimensions of one major and one minor side wall;

(ii) each of the corner segments including a circular section having a constant radius of curvature that is less than one-half the horizontal dimension of one minor side wall, and each of said bottom corner segments including two of such circular sections and a generally straight section disposed at approximately a 45° angle between the circular sections;

(iii) said top section generally lying along a line disposed convex in a direction away from the bottom section across the bag between the top corner sections and spaced from the bottom section at its center a distance approximately equal to the combined horizontal and vertical dimensions of one minor side wall to define a central dome;

(e) a spout communicating with the interior of the bag at a location along the convex top section line spaced from the adjacent side section a distance greater than one-half the horizontal dimension of the minor side wall;

(f) said bag being adapted to be filled with liquid product to a height relative to the box to below the top wall thereof, so that the liquid product, when subjected to freezing conditions can freeze initially about the horizontal perimeter and thereafter freeze along a vertically located central core as a hump expanding into the bag dome and against the top wall of the box.

4. A bag for confining a normally liquid product in a frozen state, the bag being adapted to be held in an exterior box of paperboard having opposed interconnected pairs of parallel major and minor side walls, and opposed parallel top and bottom walls; the combination comprising:

(a) said bag being formed from two flat sheets disposed in face to face relationship joined together by a peripheral seam including, when the bag is in the collapsed condition, side segments, top and bottom segments, and interconnecting corner segments, (i) said side segments being spaced apart a distance equal to the combined horizontal dimensions of one major and one minor side wall;

(ii) each of the corner segments being curved between the respective side, top and bottom segments, concavely toward the interior of the bag on a radius of curvature of the order of magnitude comparable to one-half the horizontal dimension of one minor side wall;

(iii) said top segment generally lying along a line disposed convex in a direction away from the bottom section across the bag between the top corner sections and spaced from the bottom section at its center a distance comparable to the combined horizontal and vertical dimensions of one minor side wall to define a central dome;

(b) a spout communicating with the interior of the bag at a location along the convex top section line spaced from the adjacent side seam a distance greater than one-half the horizontal dimension of the minor side wall;

(c) said bag being adapted to be filled with liquid to a height relative to the box to below the top wall thereof, so that the liquid, when subjected to freezing conditions can freeze initially about the horizontal perimeter and thereafter freeze along a vertically located central core as a hump expanding into the bag dome and against the top wall of the box.

5. A container for confining a normally liquid product in a frozen state, the combination comprising:

(a) a box of paperboard having opposed interconnected pairs of parallel major and minor side walls, and opposed parallel top and bottom walls;

(b) each major side wall of the box having approximately equal horizontal and vertical dimensions, and each minor side wall of the box having a horizontal dimension that is approximately one-half that of the major side wall;

(c) means disposed within the paperboard box and supported by the side walls thereof for confining said product initially as a liquid;

(d) said box being filled with liquid product to a height below the top wall thereof, so that the liquid product, when subjected to freezing conditions, can freeze initially about the horizontal perimeter and thereafter freezes along avertically located central core which expands as a hump against the top wall of the box.

6. A container for confining a normally liquid product in a frozen state, the combination comprising:
(a) an exterior box of paperboard having opposed interconnected pairs of parallel major and minor side walls, and opposed parallel top and bottom walls;
(b) each major side wall having approximately equal horizontal and vertical dimensions, and each minor side wall having a horizontal dimension that is approximately one-half that of the major side wall;
(c) a partition disposed within the box dividing it into four cells, and including:
(i) a first blank of paperboard fold to form opposed foot elements adjacents the bottom wall and extending inwardly from free edges, respectively located adjacent one pair of side walls, opposed vertical elements hinged at the lower ends to the inner edges of the foot elements, and a web element interconnecting the upper ends of the vertical elements;
(ii) a second blank of paperboard having an open ended bottom slot disposed over and cooperating with an open ended top slot in the web and vertical elements of the first blank of paperboard to define a cross vertical element extended between the one pair of side walls and the top and bottom walls;
(d) a bag of a plastic film material disposed within each cell and supported by the respective body side walls and vertical partition elements, and confining said product.

7. A container for confining a normally liquid product in a frozen state, the combination comprising:
(a) an exterior box of paperboard having opposed interconnected pairs of parallel major and minor side walls, and opposed parallel top and bottom walls;
(b) each major side walls having approximately equal horizontal and vertical dimensions, and each minor side wall having a horizontal dimension that is approximately one-half that of the major side walls;
(c) a partition disposed within the box dividing it into four cells, and including:

(i) a first blank of paperboard folded to form opposed foot elements adjacent the bottom wall and extending inwardly from free edges, respectively located adjacent one pair of side walls, opposed vertical elements hinged at the lower ends to the inner edges of the foot elements, and a web element interconnecting the upper ends of the vertical elements;

(ii) a second blank of paperboard having an open ended bottom slot disposed over and cooperating with a corresponding open ended top slot in the web and vertical elements of the first blank of paperboard to define a cross vertical element extended between the one pair of side walls and the top and bottom walls;

(d) said web element having a width dimension sufficient to separate thereby the first blank vertical partition elements to define therebetween an elongated interior cavity between the other pair of side walls and said other pair of side walls having openings formed therein communicating with the defined cavity;

(e) a bag of a plastic film material disposed within each cell and supported by the respective body side walls and vertical partition elements, and confining said product.

8. A container according to claim 7, wherein tabs are hinged to the other side walls and are formed from paperboard in the areas from which each opening is defined and adapted to be folded into the cavity between the first blank vertical partition elements for locating said elements.

9. A container according to claim 7, wherein openings are provided in the top wall of the container and in the web element in registry with the cavity defined between the first blank vertical partition elements.

10. A container according to claim 2, wherein the spout extends at an angle inclined from adjacent one minor side wall toward the center of the box.

11. A container according to claim 2, wherein the bag is disposed in the box with its peripheral seam located approximately centrally of the minor side walls and the top and bottom side walls.

References Cited
UNITED STATES PATENTS

| | | | |
|---|---|---|---|
| 2,133,021 | 10/1938 | Ferguson | 99—181 |
| 2,225,810 | 12/1940 | Waters | 206—46 XR |
| 2,293,182 | 8/1942 | Vogt | 229—14 |
| 2,954,901 | 10/1960 | Winstead | 229—14 |
| 3,112,047 | 11/1963 | Weinreich et al. | 229—14 XR |
| 3,123,254 | 3/1964 | Rapby et al. | 222—105 |
| 3,199,742 | 8/1965 | Hill | 229—14 XR |
| 3,297,226 | 1/1967 | Scholle | 229—14 |

DAVIS T. MOORHEAD, *Primary Examiner.*